United States Patent [19]

Atherton et al.

[11] Patent Number: 4,745,893
[45] Date of Patent: May 24, 1988

[54] DIGITAL OIL LEVEL SENSOR

[75] Inventors: Kim Wesley Atherton; A. Brinkley Barr; Thomas M. Harmon; Michael M. Van Schoiack; Marvin E. Vandehey; Richard D. Weyerts, all of King County; Charles R. Clow; Patrick H. Mawet, both of Snohomish County, all of Wash.

[73] Assignee: Caterpillar Inc., Peoria, Ill.

[21] Appl. No.: 937,553

[22] Filed: Dec. 3, 1986

[51] Int. Cl.$^4$ .............................................. F01M 1/00
[52] U.S. Cl. .................................. 123/196 S; 184/108; 184/105.1; 184/1.5; 184/6.4
[58] Field of Search ................... 123/196 R, 196 S; 184/108, 103.1, 105.1, 1.5, 6.4; 340/59, 618

[56] References Cited

U.S. PATENT DOCUMENTS

| | | | |
|---|---|---|---|
| 4,344,136 | 8/1982 | Panik | 340/64 |
| 4,459,584 | 7/1984 | Clarkson | 340/539 |
| 4,583,085 | 4/1986 | Beller | 340/59 |
| 4,609,796 | 9/1986 | Bergsma | 340/59 |
| 4,628,302 | 12/1986 | Barr et al. | 340/59 |
| 4,638,288 | 1/1987 | Remec | 340/59 |
| 4,654,646 | 3/1987 | Charboneau | 340/59 |

FOREIGN PATENT DOCUMENTS 466684 11/1951 Italy ...................................... 340/59

Primary Examiner—E. Rollins Cross
Attorney, Agent, or Firm—Terry D. Morgan; Robert E. Muir

[57] ABSTRACT

An oil level sensor includes a sensor body adapted to be mounted to the block or casing of an oil-containing reservoir. A probe including a pair of electrodes forming a capacitor extends from the sensor body so that the capacitor will be at least partially immersed in the oil to detect the level thereof. At least one of the electrodes is insulated so that the apparent capacitance of the capacitor is relatively insensitive to any change in the conductivity of the oil at high temperatures. Circuitry is provided in response to the capacitance of the capacitor for signalling the level of the oil, which capacitance is a function of the oil level. The sensor body is mounted to the block by external threads on the probe. The electrodes of the probe extend proximally past the threads to provide an increased capacitance for the sensor. The electrodes of the probe are concentric and the inner electrode is supported at both ends to reduce fatigue. Circuitry is also provided for automatically testing the proper operation of the sensor.

26 Claims, 2 Drawing Sheets

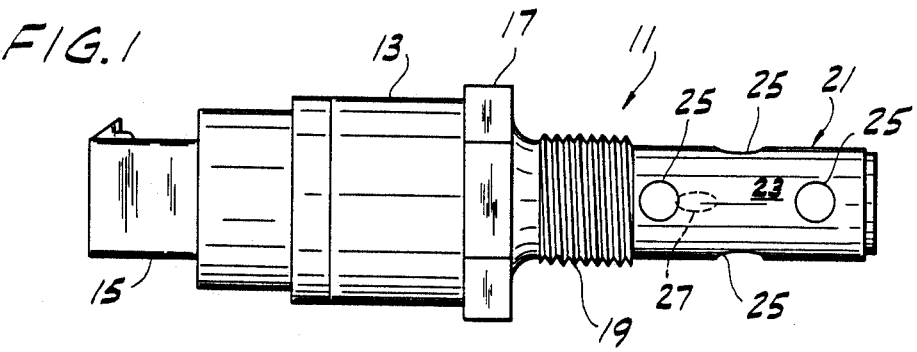
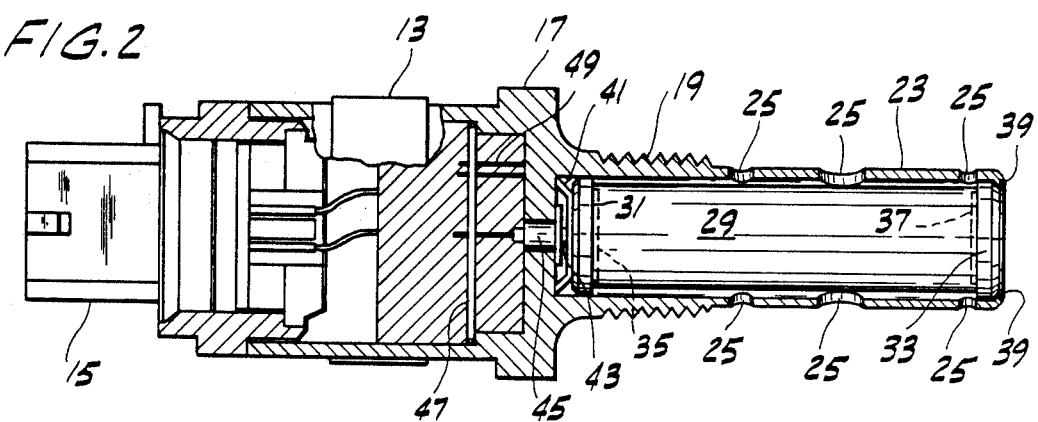
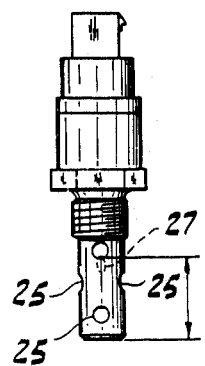
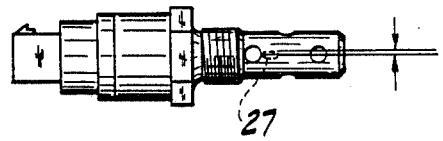
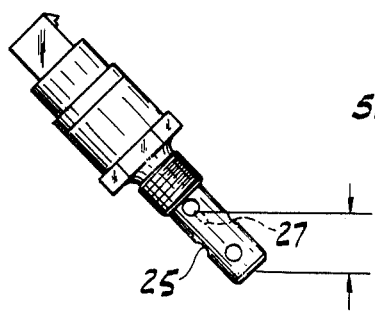
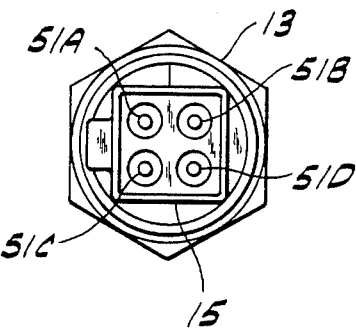

DIGITAL OIL LEVEL SENSOR

BACKGROUND OF THE INVENTION

This invention relates to sensors for use with internal combustion engines, transmissions, differentials and vehicular oil systems, and more particularly to oil level sensors for such engines and the like which are particularly suited for use with electronic and computerized control systems.

Various oil level sensors are currently being used in automotive and related applications to supply oil level information to engine control systems, including computerized control systems. Such information is particularly important in the case of heavy equipment such as mining and other heavy construction equipment. The working environment of the engine in these cases is particularly harsh and the equipment is expensive. Although the present invention is especially suited to such environments, it is not so limited. Some sensors which are currently being used to sense the oil level in internal combustion engines are known as thermal dissipation sensors. These sensors are relatively low in cost and are relatively easy to interface with control systems, but they do have certain features which could be improved. For example, the power consumption of thermal dissipation sensors is undesirably high while the durability of such sensors (an important quality considering the extremes which such sensors have to endure) is less than one would like. In addition, these sensors tend to cause the amount of carbon in the oil to increase, which is not a desirable feature Float switches are also used for oil level sensing, and these switches are relatively low in cost. However, float switches are not particularly reliable and they suffer from a limited temperature range. Dipsticks and sightglasses have also been used as oil level sensors. These latter sensors are relatively inconvenient to use and they do not interface well with electronic or computerized control systems. Their utility is further reduced because of the fact that they must in general be read manually. A capacitive probe sensor is also available for sensing oil level. It has the advantage of being a low power consuming device, but it does suffer from a reduced operating margin. That is, present capacitive probes are not believed to be adequately sensitive to the minute capacitance changes occurring as oil levels change throughout the entire range of operating conditions of the engine itself.

SUMMARY OF THE INVENTION

Among the various objects and features of the present invention may be noted the provision of an improved oil level sensor which is particularly adapted for use with electronic and computerized engine control systems and the like;

the provision of such an oil level sensor which has reduced power consumption;

the provision of such an oil level sensor which is durable and usable throughout a wide range of operating conditions of an internal combustion engine and the like;

the provision of such an oil level sensor which is reliable in operation;

the provision of such an oil level sensor which is convenient to use and provides substantially continuous information on the oil level to the engine control system and the like; and the provision of such an oil level sensor which has an increased operating margin.

Other objects and features will be in part apparent and in part pointed out hereinafter.

Briefly, in a first embodiment of the present invention, an oil level sensor includes a sensor body adapted to be mounted to the block or the like of an internal combustion engine. A probe including a pair of electrodes forming a capacitor extends from the sensor body so as to at least partially immerse the capacitor in oil during normal conditions of use to detect the level thereof. At least one of the electrodes is substantially insulated so that the apparent capacitance of the capacitor is relatively insensitive to any change in the conductivity of the oil at high temperatures. Means are included which are responsive to the capacitance of the capacitor for signalling the level of the oil, the capacitance being a function of the oil level.

In a second embodiment of the present invention, the oil level sensor includes a sensor body, means for mounting the sensor body to the block or the like of an internal combustion engine, and a probe. The probe includes a pair of electrodes forming a capacitor and extends from the sensor body so as to at least partially immerse the capacitor in oil during normal conditions of use to detect the level thereof. The mounting means is disposed exteriorly about the proximal end of the probe adjacent the main portion of the sensor body. The electrodes define a gap therebetween and extend proximally toward the main portion of the sensor body at least a significant distance past the distal end of the mounting means. Means are also included which are responsive to the capacitance of the capacitor for signalling the level of the oil.

In a third embodiment of the present invention, the oil level sensor includes a sensor body adapted to be mounted to the block or the like of an internal combustion engine and a probe including a pair of electrodes forming a capacitor extending from the sensor body so as to at least partially immerse the capacitor in oil during normal conditions of use to detect the level thereof. The electrodes define a gap therebetween and extend distally from the main portion of the sensor body generally to the end of the probe. Means are included for securing the electrodes against relative movement with respect to each other, which securing means are disposed at each end of at least one of the electrodes. Additional means electrically connected to the capacitor and responsive to the capacitance of the capacitor signal the level of the oil.

In a fourth embodiment of the present invention, an oil level sensor includes a sensor body adapted to be mounted to the block or the like of an internal combustion engine. A probe including a pair of electrodes forming a capacitor extends from the sensor body so as to at least partially immerse the capacitor in oil during normal conditions of use to detect the level thereof. Means are disposed in the sensor body which are responsive to the capacitance of the capacitor for signalling the level of the oil. Further means are provided for automatically testing the proper operation of the signalling means for both the presence and absence of oil at a predetermined level.

BRIEF DESCRIPTION OF THE DRAWINGS

FIG. 1 is a side elevation of the oil level sensor of the present invention;

FIG. 2 is a side elevation similar to FIG. 1 with parts broken away to reveal the internal construction of the oil level sensor;

FIG. 3 is a side elevation on a reduced scale showing the oil level sensor in a vertical orientation;

FIG. 4 is a side elevation similar to FIG. 3 showing the oil level sensor in a horizontal orientation;

FIG. 5 is a side elevation similar to FIG. 3 showing the oil level sensor at a forty-five degree angle;

FIG. 6 is an end view of the sensor of FIG. 1; and

Similar reference characters indicate similar parts throughout the several views of the drawings.

DESCRIPTION OF THE PREFERRED EMBODIMENT

Figure 7:
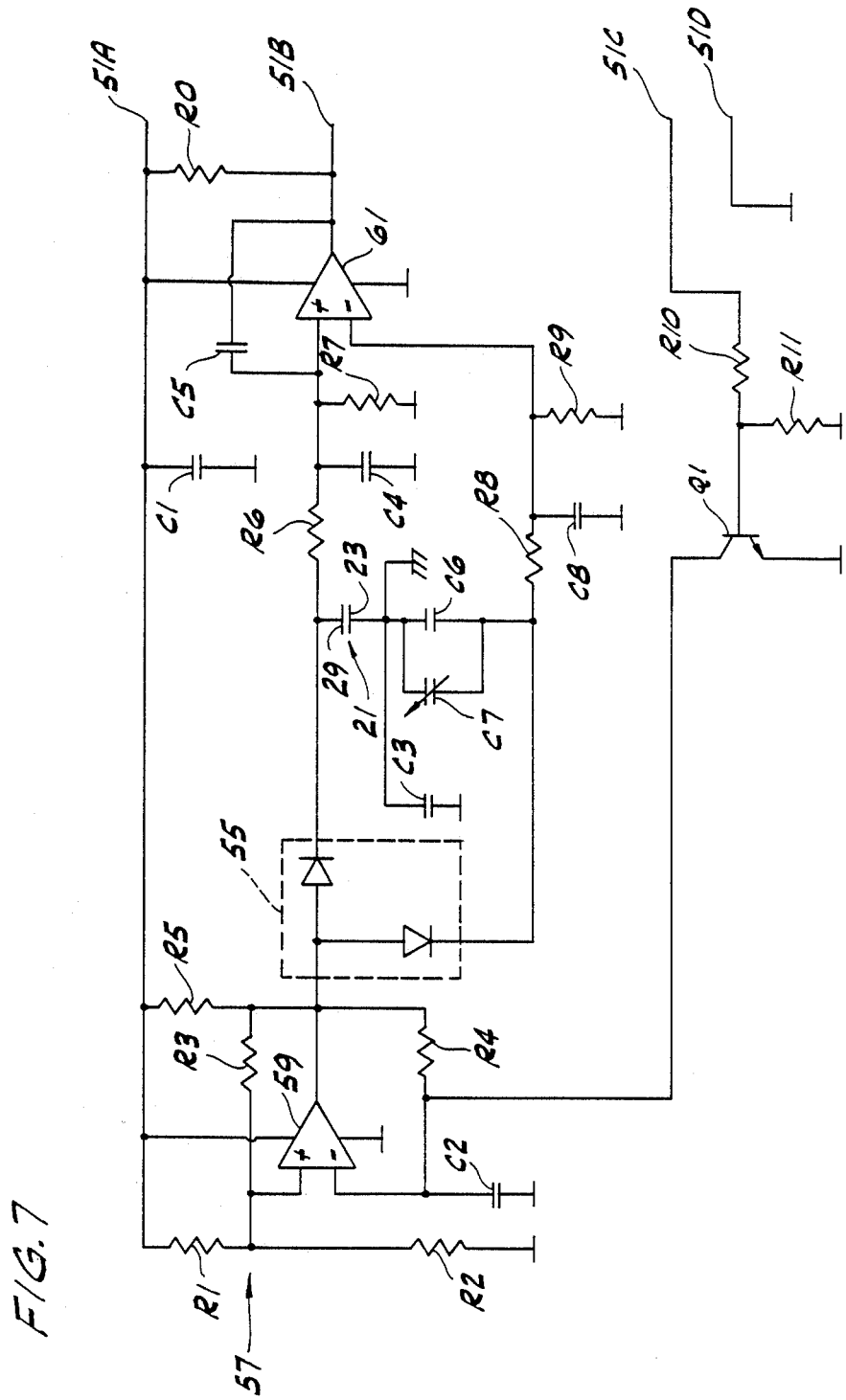
FIG. 7 is an electrical schematic of the circuitry of the oil level sensor of FIG. 1.

Turning now to the drawings, there is shown an oil level sensor 11 having a main or body portion 13, which houses the on-board electronics of the sensor, terminating on the left in a suitable connector 15, such as the Packard-type connector shown. Sensor body 13 has integrally formed therewith a hexagonal wrench-engaging surface 17 to facilitate the securing of the sensor in the block or the like (not shown) of an internal combustion engine. Adjacent hexagonal surface 17 are screw threads 19 which constitute means for mounting the sensor on the engine block. Screw threads 19 are integrally formed on the outer surface of a probe 21 which extends distally from the main portion of body 13. This outer surface is preferably integrally formed with body 13 and constitutes a first electrode 23 of a sensing capacitor described below.

Probe 21 is cylindrical, which makes fabrication and installation of the probe relatively easy. A plurality of holes or orifices 25 pass through electrode 23 at various locations to allow the oil whose level is being sensed to flow freely into and out of the interior of the probe. Also shown in FIG. 1, although not physically present on sensor 11 itself, is an ellipse 27 which illustrates the set points of the sensor (see discussion in connection with FIGS. 3-5).

Disposed inside cylindrical electrode 23 is a second, smaller cylindrical electrode 29 (FIG. 2) which is substantially concentric with electrode 23. A pair of ceramic (or an alternative insulating material) disks 31 and 33 support electrode 29 at each end and secure it against radial movement with respect to outer electrode 23. Electrode 29 has hollowed out end portions to receive shoulders 35 and 37 on disks 31 and 33. With this method of attachment, the smaller electrode is supported solely from inside. This reduces the stray capacitance between electrodes 23 and 29 since no high dielectric material is introduced into the gap between the two electrodes. In addition, since electrode 29 is supported at both ends, the electrode is not subjected to the fatigue-inducing low-frequency vibrations which affect cantilevered electrodes. Ceramic disk 33 at the distal end of the probe is held in place by crimping of the distal end of electrode 23 at shown at 39. This, or some other simple and economical mechanical attachment, holds the inner electrode in place. A belleville washer 41 is disposed in the proximal end of the recess or hollow in electrode 23 in which electrode 29 fits. This washer allows the fabrication tolerances for sensor 11 to be increased while still preventing vibration of the inner electrode.

Washer 41 has a central opening through which passes a conductor 43 which makes the electrical connection between electrode 29 and the circuitry of FIG. 7. Conductor 43 passes through a suitable seal 45, of glass or the like, in the wall of sensor body 13. Since the seal 45 is completely separate from the supporting structure for the inner electrode, stress on conductor 43 and seal 45 are drastically reduced.

Sensor body 13 has a circuit board 47 mounted and potted therein. The circuit board carries the electronics of FIG. 7 and the electrical connection to conductor 43 is made on this board. A similar conductor 49 electrically connects electrode 23 (the outer electrode) to circuit board 47. Four wires (see FIG. 6 for the corresponding pins) connect circuit board 47 to the external control system via plug or connector 15.

Electrode 29 is preferably metal with an insulated layer over nearly its entire surface area. Anodized aluminum works well as the material for electrode 29, since the insulation formed by the anodizing is durable and easy to fabricate. It has been found that various oils begin to conduct electricity to a slight, but significant degree at elevated temperatures such as are typical of internal combustion engines. As a result, the oil which functions solely as a dielectric at room temperature becomes a conductor (albeit a poor one) at elevated temperatures and the conductivity effects begin to mask the dielectric constant/capacitive effects which sensor 11 is designed to detect. Insulating electrode 29 minimizes this problem and results in a sensor 11 with increased temperature stability.

Electrode 29 extends proximally a significant distance past the distal end of screw threads 19. In fact it extends all the way past the proximal end of the threads, even though this part of probe 21 is located in the wall of and outside the block. This feature of recessing the electrodes which make up the sensing capacitor results in significantly more capacitive signal potential for the probe without increasing the sensor size. As a result sensor 11 can be used in places where the space available is constrained. In addition, since the sensor has more capacitance than it would otherwise, the gap between the electrodes can be selected from a greater possible range of values to provide an increased operating margin and reliability.

For a given maximum outer electrode diameter, the gap between electrodes 23 and 29 is selected to provide an operating margin for the sensor optimized with respect to response time and electronics stability. In selecting the gap size, two primary factors must be taken into consideration. One is that the capacitance of the probe increases as the gap size decreases. Since the detection of the presence or absence of oil depends on the capacitance detected by the electronic circuitry, and since these capacitances are in general very small, the gap size should be decreased as much as possible to increase the capacitance. However, the extent to which oil "clings" in the gap, even when the surrounding oil drops below the level of the oil in the probe, also increases when the gap size decreases. Once the gap size is reduced to a certain point, the probe will always indicate the presence of oil, even when no oil is present around the probe, because of the cling effect. For a gap size less than the critical gap size which the working fluids cannot bridge (typically 0.1 inches for most oils), there will always be a certain amount of oil clinging to the inside of the probe. This amount results in a "useless" volume of the probe, which reduces the probe's useful signal variation and makes electronic detection of the oil level a more demanding and expensive task. Of course, the larger the gap size the quicker oil tends to drain out of the sensor, and the faster the response time of the sensor to falling oil level. For many applications, a response time of ten seconds is satisfactory so the gap is selected to ensure this response time or better. For the present sensor configuration, a gap of approximately 0.05 inch has been found to provide such a response time. Note that this gap is about one-half the gap of 0.1 inch found in prior art sensor which have no oil clinging in the gap. But such a large prior art gap provides substantially less capacitance for a given configuration and thus requires considerably more expensive electronics to detect the smaller capacitance changes. With the smaller gap of the present invention, relatively inexpensive electronics may be used and, in addition, the operating margin of the sensor is increased at the same time. The operating margin in this sense is the capacitance of the probe having its gap filled with an oil of the minimum dielectric minus the capacitance of the probe with oil having a maximum dielectric clinging in the gap. For generally acceptable response times (e.g. ten seconds or less), the operating margin is a decreasing function of gap size. More importantly these acceptable response times are achievable with gap sizes which result in significant clinging of oil to the probe. As a result, operating margin is improved using gap sizes heretofore not used in capacitive probes because of clinging.

The ellipse 27 (see FIGS. 3–5) illustrates the typiCal set point of sensor 11 (which is determined by the electronic circuit). For any orientation, the ellipse should be covered for the sensor to register the presence of oil. The full/low set point is, therefore, determined by drawing a horizontal line tangent the upper extent of ellipse. The set points are illustrated for a vertical orientation of the sensor (FIG. 3), for a horizontally disposed probe (FIG. 4), and for the probe disposed at a forty-five degree angle (FIG. 5).

In FIG. 6, the four conductors 51A–D which connect the sensor electronics with the external control system are shown. As will become apparent two of these pins form the power supply for the circuitry of sensor 11, one provides the self-test feature of the present invention, and the final pin carries the output of the circuitry to the external control system.

The components on circuit board 47 are selected for their ability to withstand temperatures of 150 degrees Centigrade and above. The circuit itself is designed so that component drift with temperature and age is for the most part self-compensating. For example, matched components such as a matched diode package 55 are used. Additionally, the circuit provides inexpensive control over drift effects by comparing two circuit legs of similar design and construction.

More particularly, pin 51A supplies a predetermined voltage from 4.5 to 15 volts DC to the circuitry of FIG. 7. Pin 51D provides the circuit ground and completes the power supply for the circuitry. A 0.1 micro-F capacitor C1 is connected across the supply. Power is supplied to an oscillator 57 which comprises a CA3290-type comparator 59, a 15K resistor R1, a 1.5K resistor R2, a 27K resistor R3, a 39K resistor R4, a 5.1K resistor R5, and a 1000 pF capacitor C2 connected as shown. The output of comparator 59 is a train of pulses at a predetermined frequency determined by the values of the components listed above, which pulse train is supplied through matched diode pair 55 to the two legs of the circuit.

The upper leg of the circuit of FIG. 7 includes probe 21, and specifically electrodes 23 and 29 of probe 21. Since the capacitance of the capacitor formed by these two electrodes varies depending upon the amount of oil (dielectric) in the gap between them, this leg of the circuit is the variable portion. A 0.1 micro-F capacitor C3 is connected between electrode 23 and the circuit ground. The pulse train from oscillator 57, as modified by the capacitance of probe 21, passes through a filter consisting of a 221K resistor R6, a 0.01 micro-F capacitor C4 and a 200K resistor R7 to the non-inverting input of a comparator 61. A 12 pF capacitor C5 provides positive feedback for comparator 61 and a 5.1K resistor RO is connected between its output and the positive voltage source.

The lower leg of the circuit is similar to the upper leg, but it is connected to the inverting input of comparator 61. Instead of the capacitor made up of electrodes 23 and 29, the lower leg of the circuit includes a 22 pF capacitor C6 in parallel with a selectively adjustable capacitor C7 having a capacitance of between two and ten pF. Capacitor C7 is provided so that the set point of the sensor may be adjusted. The pulse train from oscillator 57, as modified by capacitors C6 and C7, passes through a filter consisting of a 200K resistor R8, a 0.15 micro-F capacitor C8, and a 200K resistor R9 to the inverting input of comparator 61.

When oil is present in the sensor at the level corresponding to the set point of sensor 11, the signal on the non-inverting input to comparator 61 is greater than that on the inverting input, so the output of the comparator goes High. This High signal is supplied over pin 51B to the external control circuitry and indicates the presence of oil at the sensor. Conversely, when the oil level is below the set point, the output of comparator 61 is Low. Of course shorting of electrodes 23 and 29 by water or metal particles also result in the output of the comparator going Low, to indicate a possible problem condition.

As is readily apparent, the circuitry of FIG. 7 is dc-current isolated, which eliminates ground loops and enhances system reliability.

The self-test signal for the circuitry of FIG. 7 is supplied to the circuitry over pin 51C. This pin is ordinarily grounded, reducing system power requirements. When the pin goes High, it switches on an NPN transistor Q1. More specifically, the signal on pin 51C is supplied through a voltage divider made up of two 10K resistors R10 and R11 to the base of transistor Q1. When transistor Q1 conducts, it disables oscillator 57. The values of the components in the two legs of the circuit discussed above have been selected so that whenever the oscillator is disabled, the output of comparator 61 goes High momentarily, followed by a stable Low output so long as the self-test signal is applied. In this way regardless of the initial oil level indication of the sensor, the opposite output state can be induced, verifying the ability of the circuit to indicate both states. If the oscillator has failed before the self-test signal is applied, the comparator output stays Low even after the self-test signal is removed.

Although the present invention has been described with reference to an oil level sensor which indicates only the presence or absence of oil, it should be appreciated that this is a feature of the switched output and that the sensor and circuitry are not inherently so limited and can, in fact, be used in a sensor which indicates the actual level of the oil as well.

In view of the above, it will be seen that the objects of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. An oil level sensor suitable for use with internal combustion engines, transmissions, differentials, vehicular oil systems, and the like comprising:
   a sensor body adapted to be mounted to the block, casing or the like of an oil-containing reservoir;
   a probe including a pair of electrodes forming a capacitor, said probe extending from said sensor body so as to at least partially immerse the capacitor in oil during normal conditions of use to detect the level thereof, at least one of said electrodes being substantially insulated so that the apparent capacitance of the capacitor is relatively insensitive to any change in the conductivity of the oil a high temperatures; and
   means responsive to the capacitance of said capacitor for signalling the level of the oil, said capacitance being a function of said oil level.

2. The oil level sensor as set forth in claim 1 wherein said insulated electrode is anodized aluminum.

3. The oil level sensor as set forth in claim 1 wherein the electrodes are substantially concentric cylinders, one of said cylinders being hollow and having an inner diameter larger than the outer diameter of the other, smaller cylinder, whereby a gap is formed between the two cylinders.

4. The oil level sensor as set forth in claim 3 wherein the larger cylinder includes external mounting means for mounting the sensor body to the oil-containing reservoir, the hollow interior of said larger cylinder including an interior recess which extends longitudinally at least a significant distance into the portion of the larger cylinder bearing the mounting means, the smaller cylinder being disposed in said recess.

5. The oil level sensor as set forth in claim 3 wherein the width of the gap is a predetermined constant selected to provide an increased operating margin of the sensor over that which may be obtained with a gap which allows oil to completely drain from the sensor, said width of the gap being such as to retain some clinging oil under all operating conditions.

6. An oil level sensor suitable for use with internal combustion engines, transmissions, differentials, vehicular oil systems, and the like comprising:
   a sensor body;
   means for mounting the sensor body to the block, casing, or the like of an oil-containing reservoir;
   a probe including a pair of electrodes forming a capacitor, said probe extending from said sensor body so as to at least partially immerse the capacitor in oil during normal conditions of use to detect the level thereof, said mounting means being disposed exteriorly about the proximal end of the probe adjacent the main portion of the sensor body; said electrodes defining a gap therebetween and extending proximally toward the main portion of the sensor body at least a significant distance past the distal end of the mounting means; and
   means responsive to the capacitance of said capacitor for signalling the level of the oil, said capacitance being a function of said oil level.

7. The oil level sensor as set forth in claim 6 wherein the electrodes are substantially concentric cylinders and the mounting means includes threads disposed on the exterior proximal surface of the outer cylinder.

8. The oil level sensor as set forth in claim 7 wherein the inner electrode extends proximally at least substantially the entire length of the threads.

9. The oil level sensor as set forth in claim 6 wherein the width of the gap is a predetermined constant selected to provide an increased operating margin of the sensor over that which may be obtained with a gap which allows oil to completely drain from the sensor, said width of the gap being such as to retain some clinging oil under all operating conditions.

10. An oil level sensor suitable for use with internal combustion engines, transmissions, differentials, vehicular oil systems, and the like comprising:
    a sensor body adapted to be mounted to the block, casing, or the like of an oil-containing reservoir;
    a probe including a pair of electrodes forming a capacitor, said probe extending from said sensor body so as to at least partially immerse the capacitor in oil during normal conditions of use to detect the level thereof, said electrodes defining a gap therebetween and extending distally from the main portion of the sensor body generally to the end of the probe;
    means for securing the electrodes against relative movement with respect to each other, said means being disposed at each end of at least one of the electrodes; and
    means electrically connected to the capacitor and responsive to the capacitance of said capacitor for signalling the level of the oil, said capacitance being a function of said oil level.

11. The oil level sensor as set forth in claim 10 wherein one of the electrodes is hollow and protrudes from the sensor body to define the probe, the other electrode being sized to fit within said hollow electrode, said hollow electrode being crimped at the distal end to hold the inner electrode in place.

12. The oil level sensor as set forth in claim 11 further including means for mechanically sealing the capacitor from the signalling means, said sealing means being separate from the securing means.

13. The oil level sensor as set forth in claim 10 wherein the electrodes are substantially concentric cylinders, the inner cylinder being secured in place at the distal end by a non-metallic end cap.

14. The oil level sensor as set forth in claim 13 wherein the end cap is disposed outside the gap between the cylinders.

15. The oil level sensor as set forth in claim 10 wherein the electrodes are substantially concentric cylinders, the inner cylinder being secured in place at the proximal end by a non-metallic end cap.

16. The oil level sensor as set forth in claim 15 wherein the end cap is disposed outside the gap between the cylinders.

17. The oil level sensor as set forth in claim 15 further including a stress-relieving element disposed between the end cap and the sensor body.

18. The oil level sensor as set forth in claim 10 wherein the one electrode is supported only at its ends and the securing means are disposed at each end of the one electrode outside the gap between the electrodes.

19. An oil level sensor suitable for use with internal combustion engines, transmissions, differentials, vehicular oil systems, and the like comprising:
   a sensor body adapted to be mounted to the block, casing, or the like of an oil-containing reservoir;
   a probe including a pair of electrodes forming a capacitor, said probe extending from said sensor body so as to at least partially immerse the capacitor in oil during normal conditions of use to detect the level thereof;
   means disposed in the sensor body and responsive to the capacitance of said capacitor for signalling the level of the oil, said capacitance being a function of said oil level; and
   means for automatically testing the proper operation of the signalling means for both the presence and the absence of oil at a predetermined level.

20. The oil level sensor as set forth in claim 19 wherein the signalling means includes an oscillator for supplying a train of pulses to the capacitor, said automatic testing means including means for temporarily disabling the oscillator output to test the entire signalling means.

21. The oil level sensor as set forth in claim 20 wherein the signalling means includes means for providing a momentary oil present signal upon the disabling of the oscillator, followed by an oil absent signal.

22. The oil level sensor as set forth in claim 19 wherein the signalling means is direct current isolated.

23. The oil level sensor as set forth in claim 19 wherein the signalling means includes high temperature rated components.

24. The oil level sensor as set forth in claim 19 wherein the signalling means is responsive to increased conductivity across the electrodes, such as caused by the presence of water or metal therebetween, to signal the absence of oil.

25. The oil level sensor as set forth in claim 19 wherein the signalling means includes a pair of generally equivalent branch circuits, the probe capacitor being disposed in one branch, the other branch having a capacitance comparable in magnitude to that of the probe capacitor.

26. An oil level sensor suitable for use with internal combustion engines, transmissions, differentials, vehicular oil systems, and the like comprising:
   a sensor body;
   means for mounting the sensor body to the block, casing, or the like of an oil-containing reservoir;
   a probe including a pair of electrodes forming a capacitor, said probe extending from said sensor body so as to at least partially immerse the capacitor in oil during normal conditions of use to detect the level thereof, said mounting means being disposed exteriorly about the proximal end of the probe;
   said electrodes defining a gap therebetween and extending proximally toward the main portion of the sensor body at least a significant distance past the distal end of the mounting means, at least one of said electrodes being insulated so that the apparent capacitance of the capacitor is relatively insensitive to any change in the conductivity of the oil at high temperatures;
   means responsive to the capacitance of said capacitor for signalling the level of the oil, said capacitance being a function of said oil level; and
   means for automatically testing the proper operation of the signalling means for both the presence and absence of oil at a predetermined level.

* * * * *